June 19, 1956  H. HOLZWARTH  2,750,740
ARRANGEMENT OF EXPLOSION CHAMBERS AND TURBINE
IN A PLANT FOR GENERATING HIGH PRESSURE GASES
Filed Dec. 24, 1951  3 Sheets-Sheet 2
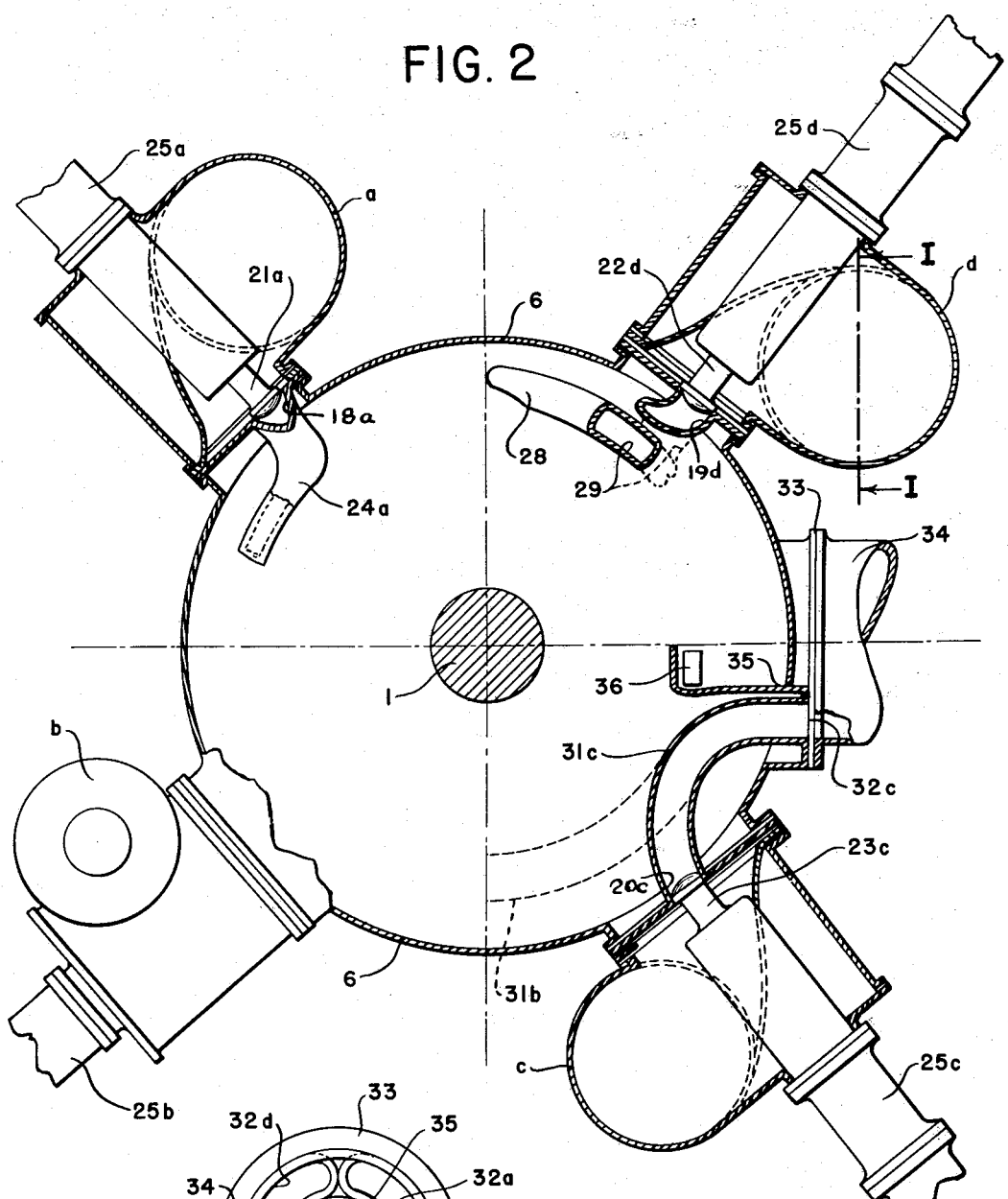
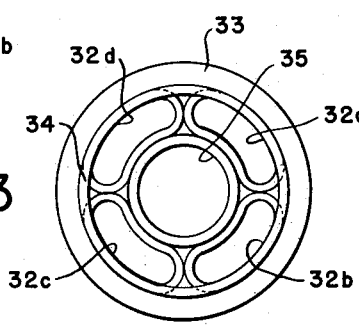
*INVENTOR.*
Hans Holzwarth
BY
ATTORNEY United States Patent Office 2,750,740
Patented June 19, 1956

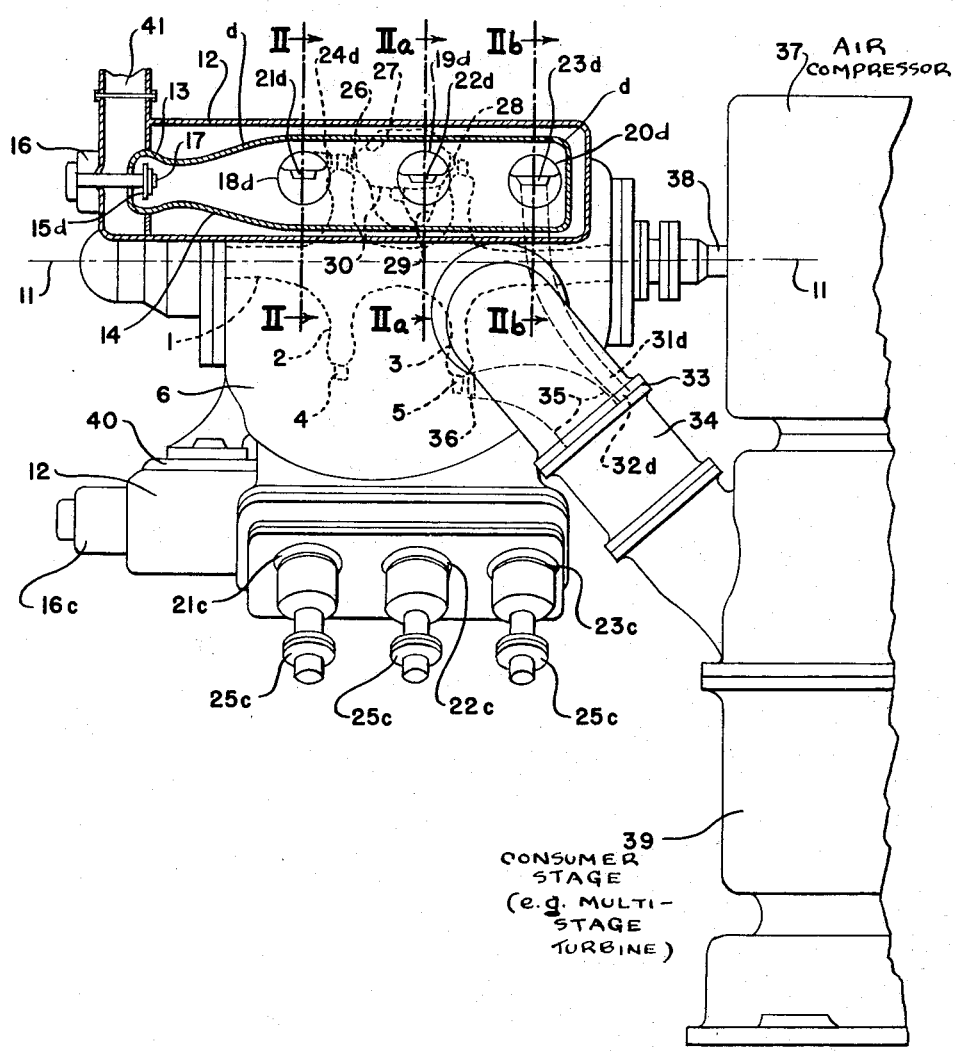

2,750,740

ARRANGEMENT OF EXPLOSION CHAMBERS AND TURBINE IN A PLANT FOR GENERATING HIGH PRESSURE GASES

Hans Holzwarth, San Francisco, Calif., assignor to Schilling Estate Company, San Francisco, Calif., a corporation of California Application December 24, 1951, Serial No. 263,119

10 Claims. (Cl. 60—39.16)

The present invention relates to heat power plants having at least one explosion turbine stage consisting of explosion chambers and nozzle and blading aggregates, and a consumer unit which utilizes the combustion gases delivered by the explosion turbine stage.

The invention relates in particular to explosion turbine plants wherein the explosion turbine stage, that is, the turbine rotor receiving directly live explosion gases from the constant volume explosion chambers forming part of the plant, is comprised of a plurality of turbine wheels provided with separate nozzle assemblies in advance of the same and charged with combustion gases withdrawn in sequence from each of the explosion chambers at a plurality of tap points, the working cycles of the several chambers being so displaced that the gases withdrawn at any moment from one chamber and charged to a subsequent explosion turbine wheel are caused to produce a fluctuating counterpressure on the preceding turbine wheel which at the same moment is receiving an explosion gas portion of higher pressure from another explosion chamber, as described in the co-pending application of August H. Schilling, entitled, "Apparatus for the Generation of Driving Gases by Explosion and Process for Operating the Same," Serial No. 263,113, filed December 24, 1951.

It is the general object of the invention to provide an improved explosion turbine plant construction which is characterized by compactness, accessibility, and convenience of installation.

It is a further general object of the present invention to provide an improved construction and arrangement of the parts of the explosion turbine plant whereby the lengths of the passage-ways between the discharge or tap points of the various explosion chambers and the nozzles and other gas-receiving elements of the plant are reduced to a minimum and thereby the heat transfer losses reduced and the heat efficiency of the plant correspondingly increased.

It is a still further object of the invention to provide an improved construction for the explosion turbine plant, including particularly the multistage explosion rotor itself, the housing therefor and the several explosion chambers, whereby such elements may be conveniently manufactured as a unit, and wherein especially the housings for the turbine rotor and the explosion chambers may be constructed as an integral part by casting, welding, or otherwise.

A further object of the invention is to provide an explosion turbine plant of the type above indicated wherein the explosion chambers extend parallel to the axis of the explosion turbine rotor and overlap the housing of such rotor to a considerable extent, and preferably to such a degree that at least some and preferably all of the valves controlling the tap points for the gases in each chamber can be arranged directly opposite, viewed in the radial direction, the nozzles or other elements of the plant designed to receive the different portions of gases generated by each explosion in a chamber.

Other features and advantages in the invention will become apparent from the following detailed description thereof.

The explosion turbine plant to which the present invention relates is of the type wherein pressure combustion gases are generated under constant volume in a plurality of explosion chambers; that is, the gases are generated by ignition of a combustible charge of fuel and air while all of the charging and discharging valves of the chamber are closed. The plant consists generally of an explosion turbine stage wherein the live explosion gases, that is, the gases having a pressure above the superatmospheric charging air pressure, are caused to operate a plurality of velocity wheels, and a consumer stage utilizing the gases exhausting from the last velocity wheel, preferably together with the residual combustion gases expelled from the chambers at a pressure equal approximately to that of the charging air, the consumer stage utilizing the gases in any desired manner. The explosion turbine itself may thus be regarded as a driving gas generating plant, the explosion turbine itself converting into mechanical energy only the energy drop from the peak explosion pressure of the gases down to a pressure corresponding to approximately the charging air pressure. The combustion gases delivered by the explosion turbine section of the plant may be employed for operating turbines which deliver the external work. It is, however, also possible for the consumer stage to utilize the combustion gases purely chemically, thermally, pneumatically and if desired also electrically, or according to other technically valuable properties of the gases.

According to the present invention, there are arranged about the nozzle and blading aggregates of the explosion turbine stage a series of elongated explosion chambers with their longitudinal axes parallel to the axis of the turbine rotor carrying the rotating bladings and with complete or partial overlapping between the turbine housing and the lengths of the explosion chambers.

Constructions of explosion turbine plants are known in which the longitudinal axes of the explosion chambers are arranged perpendicularly to the axis of the turbine rotor which carries the rotating bladings. This required a sub-floor arrangement of the explosion chambers, so that the machine foundation must be broken through. As a result, the heads of the explosion chambers with the valves and the valve control mechanism located thereat lie at the level of the machine floor, so that the installation is readily accessible either from above or from below. It has also become known to arrange the explosion chambers with their longitudinal axes parallel to the axis of the turbine rotor, but with the longitudinal extension of the chambers running in the opposite direction to the extension of the turbine housing from their point of connection, such series arrangement having been proposed because the nozzles serving for the impingement of the blading form an essentially axial continuation of the neck of the explosion chambers through which the generated combustion gases are discharged to the nozzle assembly. By this series axial arrangement of the chambers and nozzle and blading aggregates and of the housing containing the same behind each other there results an extremely large elongation of the explosion turbine plant as a whole, especially when the combustion gas drop is divided into individual pressure stages, such pressure stages disposed in separate housings, and such individual housings arranged again axially behind each other.

According to the present invention these disadvantages of the known arrangements are entirely eliminated. In my improved construction, a plurality of elongated explosion chambers are arranged with their longitudinal axes parallel to the axis of the turbine rotor with complete or partial overlapping of the turbine housing and explosion chamber lengths. The chambers are disposed about the nozzle and blading aggregates, and the length of the explosion chambers can be so determined, by suitable dimensioning of their diameter, that the longitudinal extensions of the housing and of the chambers overlap each other completely or for the greater part.

This signifies that the axial length of the plant according to the invention is in general no greater than the axial length of one of its main elements. In this way there is eliminated also the extension of the plant into spaces below the machine floor, which occurs when the longitudinal axes of the explosion chambers run perpendicularly to the rotor axis. The space reduction of the plant so attained is in numerous cases decisive for the possibility of use of the heat power plant with at least one explosion turbine stage. Such a case occurs, for example, in the installation of the driving engine in the wings of aircraft, wherein the available space is very small, and in many other uses in which only a limited space is available for mounting the power plant. Such a situation occurs also upon installation of the power plant in subterranean spaces as in mines, safety tunnels, and further upon installation in locomotives, self-propelled cars, speedboats, ships, etc.

My improved arrangement leads to a series of further advantageous possibilities by reason of the fact that the explosion chambers can be constructed lying directly against the turbine housing. This leads to the result that the high pressure, high temperature, and above all rapidly flowing combustion gases with their own tendency toward high heat transfer, find available only extremely short conduit sections, so that the heat transfers are correspondingly small, in view of the reduction of the heat transfer surfaces to a minimum. A great variety of possibilities are available for connecting the housing and chambers. Thus the housing and chambers can be flanged or screwed together, or they can be cast into a single integral part or welded to each other.

The arrangement of chambers and housing in accordance with the invention provides the constructional basis for a further development, namely to tap the explosion chambers at a multiplicity of points along their lengths for impinging the nozzle and blading aggregates, such tap points being radially opposite to the nozzles or other parts receiving the gases. Heretofore the nozzle valves, that is, the valves through which the combustion gases were periodically withdrawn from the chambers to direct the same to the nozzles and bladings of the actual explosion turbine, and the outlet valves, through which the residual gases were withdrawn from the chambers, and for whose displacement out of the chambers the charging air was generally used which served as combustion-supporting air in the next cycle, were arranged in common at the head of the explosion chambers, whenever the outlet valves were not provided directly at the housing in the immediate vicinity of the associated nozzles; but even in the last-mentioned case the withdrawal conduits leading to the outlet valves were connected to the chamber head in the vicinity of the nozzle valves. Any other arrangement would, even in the vertical arrangement of the longitudinal chamber axis with respect to the rotor axis, which was usual in these cases, have been thermodynamically unfavorable. The arrangement according to the present invention, on the other hand, affords the possibility, while reducing the heat transfer value to a minimum, of withdrawing the combustion gases from the chambers always at the place where the point of utilization is in any case located. This is of special advantage for carrying out a working process in which combustion gas portions are utilized for developing a fluctuating counterpressure having the character of an expansion, as is described in the above-mentioned application. The fall of counterpressure deliberately produced during the expansion of a combustion gas portion which is just then impinging the nozzle and blading aggregate under consideration leads necessarily to the result that the impingement and counterpressures fall with a practically constant pressure differential, so that the combustion gas drop developing in the blading under consideration correspondingly continues approximately constant. In a pressure-time diagram this is apparent from the equidistant course of the expansion and counterpressure lines. The carrying out of this type of working process assumes that the indicated form of the counterpressure course occurs synchronously with the changes of the impingement pressures. This can be attained by bringing the combustion gas portion utilized for developing the counterpressure into action during the time interval in which a higher pressure combustion gas portion is subjected to expansion in the preceding nozzle and blading system, about to the initial pressure of the counterpressure course. The means for synchronizing these events resides in the displacement of the control phases of the nozzle or tap valves through which the higher pressure combustion gas portion providing the impingement pressures is withdrawn from one chamber and the lower pressure gas portion yielding the counterpressures is simultaneously tapped from another chamber.

In consequence of the arrangement forming the subject matter of the present invention, there accordingly exists the possibility of arranging the tap points directly opposite the nozzles and bladings. At the tap points themselves, controlled discharge members are provided which can again be constructed as nozzle valves for combustion gas portions of higher initial pressure than the charging air pressure, and as outlet valves for the combustion gas residue of an initial pressure more or less coinciding with the charging air pressure. This initial pressure is suitably given to the combustion gas residue in order that the charging air does not, during a displacement of the combustion gas residue, suffer any pressure drop in the chamber, which would give occasion for unnecessary losses.

The above-mentioned advantages do not exhaust the advances made by the present invention in the field of explosion turbine technology. If explosion turbine stages are provided for feeding the consumer stage with pressure combustion gases, each of which explosion stages consists of a nozzle and blading system for driving the auxiliary machines of the plant, and of a series of explosion chambers associated with the nozzles and blading system and arranged with their longitudinal axes parallel to the axis of said system with complete or partial overlapping of the blading housing and explosion chamber extensions, there result extremely advantageous over-all arrangements, first by reason of the fact that the auxiliary machines, preferably the air compressors, can be combined each with a turbine housing and the associated explosion chambers into a constructional unit which can be referred to as a driving gas generator. In this way the result is obtained that a plurality of driving gas generating units can be arranged in parallel for feeding combustion gases to a common consumer machine. These driving gas generating units can be manufactured completely alike, preferably mass produced, that is, the driving gas capacity of the consumer machine can be accommodated simply by utilizing a suitable number of these units.

In view of the circumstance that, in general, this type of power plant is designed to develop external work in the form of mechanical output, the consumer stage will be constructed as a driving gas-consuming, output-delivering turbine arrangement; so that in this case a common gas-consuming and output-delivering turbine arrangement would be connected in the driving gas stream with a plurality of entirely similarly constructed driving gas generating units.

The invention is, however, not restricted to the last-mentioned constructions. There are special cases in which, conversely, a plurality of consumer units, even of different output, will be connected with a single driving gas generator or generator unit. Thus it is possible to set up a plurality of driving gas generator units or groups of the same and to associate therewith suitable consumer units or groups of the same. In general, all possible variations which have heretofore been found practicable for pressure steam and compressed air are applicable in similar fashion for driving gases, since the latter do not behave differently from steam or compressed air in driven machines as regards energy distribution and use. For the same reason, counterpressure and tap turbines can be constructed as consumer units.

On the accompanying drawings there is illustrated a practical embodiment of the invention in the form of a driving gas generating unit equipped with four explosion chambers. In said drawing:

Fig. 1 shows schematically a side view of the driving gas generator unit as well as the attached consumer stage, one of the explosion chambers being shown in vertical longitudinal section along the plane I—I of Fig. 2;

Fig. 2 illustrates partially vertical transverse sections through the driving gas generator along the planes II—II, IIa—IIa, and IIb—IIb of Fig. 1, and partially an end view of the explosion stage at the chamber inlet side, the sections appearing, respectively, in the upper left, upper right and lower right quadrants in Fig. 2;

Fig. 3 shows an end view of the withdrawal conduit, looking toward the left in Fig. 2;

Fig. 4 illustrates a consumer unit, such as a multi-stage turbine, operated by the high pressure exhaust gases of three separate explosion turbine gas generating units; while

Figure 5:
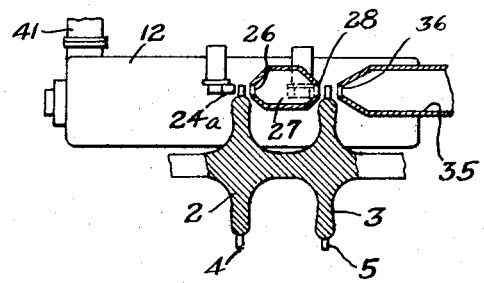
Fig. 5 is a longitudinal section through the turbine and associated parts of a gas generating unit.

The heat power plant shown in Figs. 1 and 2, with an explosion turbine stage consisting of explosion chambers and nozzle and blading assemblies, and of a consumer stage likewise in the form of a turbine, embodies a practical realization of the inventive idea. About the nozzle and blading systems of the explosion stage, which will be described more in detail below, are disposed elongated explosion chambers with their longitudinal axes parallel to the axis of the rotor carrying the rotating bladings with almost complete axial overlapping of the lengths of the turbine housing and of the explosion chambers.

As shown on the drawing, the turbo-rotor 1 having the wheels 2 and 3 on which are disposed the single rows of blading 4 and 5 are contained within the turbine housing 6. About this housing 6 are arranged four explosion chambers $a$, $b$, $c$, and $d$, in such manner that their longitudinal axes are parallel to the axis 11—11 of the rotor 1, there being almost complete overlapping of the longitudinal extensions of the turbine housing 6 and of the explosion chambers $a$—$d$. The explosion chambers are surrounded by a cooling jacket 12 which is indicated schematically in Fig. 1. The chambers consist of an inlet end section which is constructed in known manner in the form of a Venturi nozzle 13 which leads to a diffusor section 14 whose walls have a very gentle slope. In the widened portion of the Venturi nozzle there is arranged the air charging valve $15d$ which is under the control of a mechanism 16 of known type. A fuel injection valve 17 is built into the air valve 15; the fuel supply conduits, fuel pumps and the ignition devices of the explosion chambers are well-known and therefore have not been illustrated.

Each of the explosion chambers $a$—$d$ is tapped at three points indicated at 18, 19, and 20 (to distinguish the similar parts of the different explosion chambers from each other the reference numerals have the letters $a$, $b$, $c$, or $d$, attached thereto). Each of the tapped points is closed by a controlled valve, the valves 21 and 22 being designated as nozzle valves, while the valve 23 is the outlet valve for the residual combustion gases. In accordance with the present invention the valves 21, 22, and 23 are arranged directly opposite the places of use of the portions of the total quantity of combustion gases generated in each chamber by an explosion and discharged by such valves, and including the residual combustion gases. Thus there is directly connected to the nozzle valve 21 of chamber $a$ the place of use in the form of the nozzle $24a$. A correspondingly but only schematically indicated nozzle $24d$ is shown in Fig. 1 connected to the nozzle valve $21d$ of chamber $d$. As regards chamber $c$, only the external control mechanism $25c$ of the nozzle valve $21c$ of such chamber is shown in Fig. 1. The control mechanism operates hydraulically and is constructed similarly for all of the valves; as its construction is well known, it has not been shown in detail.

The individual nozzles $24a$–$d$ all lie in advance of the single row of blading 4 of the wheel 2 of rotor 1 so that, as can be seen best from the upper left-hand portion of Fig. 2, extremely short combustion gas conduits, which are generally called nozzle pre-chambers, are disposed between the nozzle valves and the nozzles. Since the nozzle pre-chambers and nozzles are cooled, and as in such pre-chambers and nozzles extremely high velocities prevail, then at the high temperatures and pressures of the gases streaming through these parts it is of the greatest importance for minimizing the heat transfer losses that these spaces be kept as small as possible, so that the heat transfer surfaces turn out correspondingly small.

Opposite to the nozzles 24 which impinge the blading 4 of the wheel 2 there is disposed a catch nozzle 26 which, as shown in Fig. 1, passes over into a collector chamber 27 which in turn is connected with a nozzle 28 arranged as the impinging nozzle in advance of the single-ringed blading 5 of the second wheel 3 of the rotor 1. The collector chamber 27 is also in communication with the valves 22, a connection 29 running from the seats of the valve to the chamber 27 and opening into such chamber. The latter thus receives combustion gases from two different sources; by way of the catch nozzle 26 it receives first of all the combustion gases which have already performed work in the nozzle and blading system 24, 4, and it receives, further, fresh or live combustion gases from the opened valves 22 by way of the connections 29 and 30. The collector chamber delivers the so caught gases by way of the common nozzle assembly 28 for impingement of the blading 5 of the second turbine wheel 3.

Figure 4:
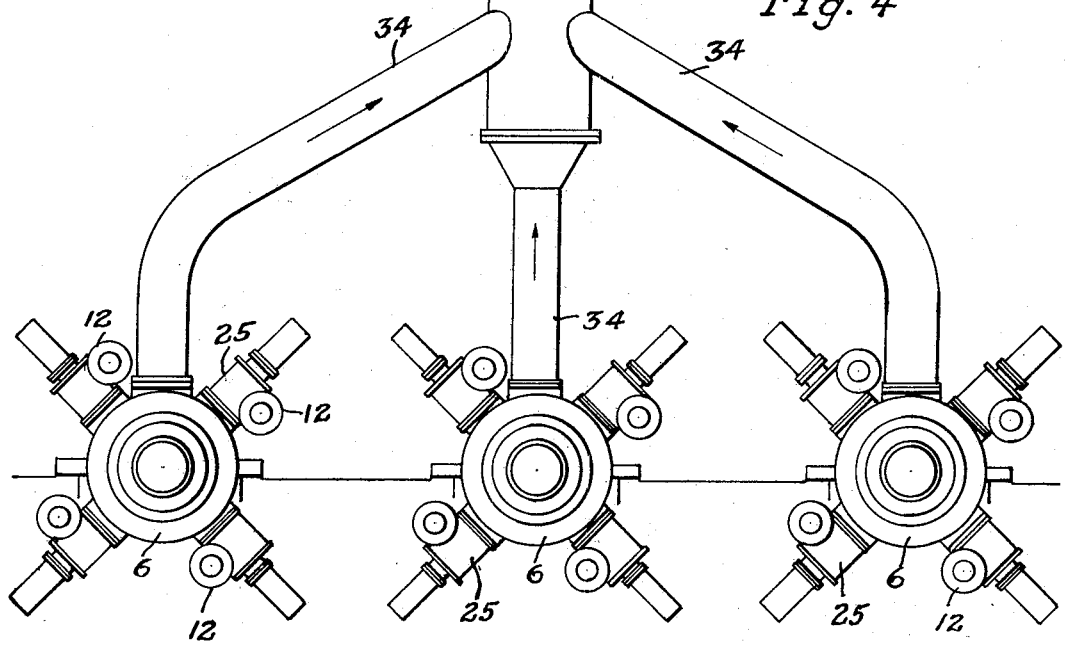

Besides the nozzle valves 21 and 22 there are provided, as already indicated, the outlet valves 23 for the residual combustion gases, the construction of the outlet valve $23c$ being shown in detail at the lower right-hand corner of Fig. 2. To the seat of the outlet valve $23c$ there is connected a bladder-like conducting member $31c$ which debouches in the form of a kidney-shaped annular segment $32c$ into the mouth or inlet end 33 of the driving gas withdrawal conduit 34. A corresponding bladder-like conducting body $31b$ leads to the outlet valve $23b$ of the explosion chamber $b$. The conducting member $31b$ likewise discharges into the mouth or inlet 33 of the withdrawal conduit 34 in the form of a kidney-shaped annular segment $32b$. A third and fourth bladder-shaped body $31d$ and $31a$ lead to the corresponding outlet valves $23d$ and $23a$ of the explosion chambers $d$ and $a$, respectively, and likewise have segment-like outlets $32d$ and $32a$ in the inlet plane 33 of the withdrawal conduit 34. The for kidney-shaped segments 32 surround the central combustion gas outlet 35 connected to the catch nozzle arrangement 36 which catches the gases after they have performed work in the nozzle and blading aggregate 28, 5 of the second turbine wheel 3 of the explosion turbine stage. This explosion turbine stage drives the auxiliary machines of the whole plant, and particularly the air compressor 37 whose drive shaft 38 is directly coupled with the shaft of the rotor 1. The driving gas withdrawal conduit 34 leads to the consumer stage 39 of the plant, which can be constructed in the form of a multi-stage Parsons turbine. It serves directly as a base or pedestal for the air compressor 37, while the elements belonging to the explosion turbine aggregate have a foundation which is schematically indicated at 40. As shown in Fig. 4, the consumer stage 39 can be operated by high pressure exhaust gases from a plurality of individual explosion turbine plants.

The mode of operation of the plant above-described is as follows:

It is assumed that a complete working cycle has just taken place in the chamber $d$. Accordingly, the chamber $d$ is still filled with the combustion gas residue having a pressure substantially that of the charging air. Upon the beginning of a new working cycle the air charging valve 15$d$ opens under the action of the control mechanism 16$d$. Simultaneously there opens also the outlet valve 23$d$ of the same chamber. The charging air entering at 41 takes on in the Venturi nozzle 13 and especially in the diffusor 14 of the chamber $d$ the form of a compressed air piston which pushes the combustion gas residue out of the chamber $d$ through the outlet valve 23$d$ which has been simultaneously opened by its control mechanism 25$d$. During the displacement of the combustion gas residue and simultaneous charging of the chamber with compressed air, the plunger of the associated fuel pump performs its feed stroke and sprays fuel into the moving air piston through the opened valve 17, so that at the instant of closing of the valves 15$d$ and 23$d$ an ignitable charge fills the chamber $d$. The combustion gas residue itself flows by way of the conduit 31$d$ into the kidney-shaped discharge segment 32$d$ and from there into the driving gas withdrawal conduit 34. As, however, the rotor housing of the blading 5 is likewise in open communication through the spaces 36 and 35 with the inlet 33 of the withdrawal conduit 34 and hence with the kidney-shaped outlet segment 32$d$, the combustion gas residue expelled through the conduit 31$d$ by the action of the charging air exerts on the blading 5 the action of a counterpressure which, by reason of the expansion which sets in within the connection 33 possesses the character of an expansion. The consequences of this action will be described more fully below.

During this residual combustion gas displacement, which is assumed to be the first section of the whole working cycle occurring in the chamber $d$, and upon which the cycle sections for ignition and explosion and likewise the two sections of a step-wise expansion follow, the valves 21 and 22 of two chambers, not yet considered, have been opened, while all valves of a fourth chamber having remained closed because in such chamber ignition and explosion have just taken place. If we consider first the chamber $a$, then it may be assumed that its nozzle valve 21$a$ has been opened. It would be likewise conceivable that one of the nozzle valves 21$b$–$d$ of the chambers $b$—$d$ has been opened. Then in the chamber $a$ either the second nozzle valve 22$a$ or none of the valves at all has been opened. The sequence is thus immaterial, it being only important that in three of the four chambers another valve has opened. Assuming that the valve 21$a$ of the chamber $a$ has opened, then this valve has discharged a combustion gas portion whose initial condition is represented by the maximum explosion pressure that is reached. This signifies that at the instant that the air charging valve 15$d$ and the outlet valve 23$d$ of chamber $d$ have opened, the maximum explosion pressure has developed in the chamber $a$. At the instant under consideration, the combustion gas portion discharged by the nozzle valve 21$c$ flows under the maximum explosion pressure to the nozzle 24$a$ and thereby the blading 4 of the wheel 2 is supplied with driving combustion gases. The same gases, after having given up a part of their available energy, drop to the blading 4, are caught by the catch nozzle 26 and conducted to the collector chamber 27.

The collector chamber, however, has in the meantime received combustion gases through the opened nozzle valve 22$b$ of chamber $b$. The nozzle valve 22$b$ has opened at the instant in which the highest explosion pressure occurred in the chamber $a$. At the same instant the valves 15$d$ and 23$d$ had opened in the chamber $d$. Under the action of the two combustion gas streams the collector chamber 27 has quickly reached a maximum pressure, that is, has quickly and completely filled with gases of higher pressure. The internal pressure which is thus rapidly built up in the chamber 27 exerts a reaction by way of the catch nozzle 26 on the blading 4 of wheel 2, which reaction occurs in the form of a definite counterpressure course. As, however, the collector chamber 27 is in open communication with the blading 5 of wheel 3 by way of the nozzle 28, the combustion gas masses discharged into chamber 27 are simultaneously subjected to an expansion, in other words, the counterpressure exerted on the wheel assembly 2, 4 by the collector chamber 27 has the character of an expansion. As the latter, in view of the described cyclic displacement of the working cycle sections in the individual explosion chambers, occurs synchronously with the impingement pressures exerted by way of the nozzle 24$d$, approximately constant drops must occur in the nozzle and blading system 24, 4.

The same action occurs with reference to the nozzle and blading assembly 28, 5. The single row of blading 5 is subjected first to the impingement pressures exerted from the collector chamber 27 by way of the nozzle assembly 28. It is subjected further, in view of the combustion gas residue discharged from the chamber $d$, to a counterpressure course which is brought into action upon the blading 5 by way of the permanently connected spaces or cross-sections 31$d$, 32$d$, 35, and 36. Since the combustion gas residue is subjected to the already described expansion, then the course of the counterpressure exerted on the blading 5 likewise has the character of an expansion. In consequence of the synchronization of the counterpressure and impingement pressure courses in relation to the blading 5 and attained by displacement of the working cycle sections in the chambers $a$—$d$, there occur also in such blading approximately constant energy drops.

What has been said in connection with the charging process of the chamber $d$, and in connection with the first partial expansion of the portion of the total gas quantity generated in the chamber $a$ and having an initial pressure corresponding to the maximum explosion pressure, and what has been said in connection with the chamber $b$ respecting the second partial expansion of a portion of the total gas quantity generated in chamber $b$ by each explosion and having a lower initial pressure (but higher than the air charging pressure), and finally what was said in connection with chamber $c$ which at the same moment was passing through the working cycle section of ignition and explosion and thus had all of its valves closed, applies naturally for all of the other working cycle sections for each of the four chambers, since the same events occur therein but in cyclic displacement.

It will be understood that the present invention is not restricted to the specific embodiment disclosed hereinabove. Thus, instead of four chambers, the plant may be equipped with any other suitable number of chambers. Also, the chambers do not need to be distributed uniformly in a circle about the turbine housing, but may also be arranged in other ways while yet incorporating the essential features of the present invention.

It will be seen from the foregoing that I have simultaneously provided an explosion turbine plane of great compactness and greater efficiency by reason of the reduced heat transfer losses. It will be recognized that for minimizing the heat losses to the greatest degree, it is important that at least the axially spaced ports for the higher pressure combustion gas portions of each chamber overlap the turbine housing and be arranged radially opposite the points to which such live combustion gases are to be conducted. It will be recognized also that by so disposing the explosion chambers that they bear directly against the turbine housing or form continuations thereof, the heat losses are still further reduced.

It will be understood that suitable valve timing and operating mechanism will be provided for opening and closing the various valves at the proper instants. Such timing and operating mechanism can be electrical, mechanical or hydraulic, or combinations of these modes of valve timing and operating. Hydraulic mechanisms of this type have proved particularly suitable for the control of the valves of explosion turbines, various forms of such devices being shown, for example, in United States Patent Nos. 1,756,139, 1,763,154, 1,786,946, 1,933,385, 2,010,019, and 2,063,928. As the valve timing and operating mechanism forms no part of the present invention, it has not been deemed necessary to illustrate the same.

I claim:

1. Heat power plant comprising an explosion turbine stage including a plurality of coaxially mounted bladed impulse rotors, a plurality of constant volume explosion chambers and a housing for the impulse rotors; at least one consumer stage, a conduit for conducting gases from the turbine housing to the consumer stage or stages; nozzles disposed laterally of the rotor bladings and arranged to discharge live explosion gases axially of the bladings; said explosion chambers being of elongated form and disposed about the turbine housing with their longitudinal axes parallel to the axis of the turbine rotor, and each having at least two outlet members spaced along the length of the chambers and discharging live gases into said nozzles; said nozzles being arranged radially inwardly of the outlet members; and control means for operating the outlet members of each chamber positively at different controlled instants and in timed relation with respect to the outlet members of the other chamber or chambers; there being at least partial axial overlapping of the turbine housing and explosion chamber lengths, the degree of overlapping being at least equal to the longitudinal distance along which all of the controlled live gas-discharging outlet members of the explosion chambers are arranged.

2. Power plant as defined in claim 1, wherein the explosion chambers bear against the turbine housing.

3. Power plant as defined in claim 1, wherein the turbine housing and the explosion chambers are secured to each other.

4. Power plant as defined in claim 1, wherein the turbine housing and the explosion chambers are cast into an integral unit.

5. Power plant according to claim 1, wherein the consumer unit is in the form of a turbine which delivers the external work of the plant, said plant including a plurality of gas generating units associated with such output turbine, said gas generating units being constructed identically, and conduits for conducting the gases exhausting from the gas generating units to the output turbine.

6. Heat power plant comprising at least one consumer stage and at least one driving gas generator unit for supplying the consumer stage with combustion gases of elevated pressure; said gas generating unit comprising a bladed impulse rotor, at least two nozzle assemblies associated with the blading and disposed laterally thereof to discharge live explosion gases axially thereagainst, a housing for the nozzle and rotor, an auxiliary machine arranged to be driven by said rotor, a group of explosion chambers associated with said rotor and nozzle assemblies and arranged with their longitudinal axes parallel to the rotor axis and at least partially overlapping the rotor housing, said chambers each having at least two outlet members spaced along the length of the chamber and discharging live gases into said nozzle assemblies, the latter being arranged radially inwardly of the outlet members, and control means for operating said outlet members at different instants and in timed relation with respect to the outlet members of the other chamber or chambers, and the degree of overlapping between the explosion chambers and rotor housing being at least equal to the longitudinal distance along which all of the controlled live gas-discharging outlet members are arranged.

7. Heat power plant as defined in claim 6, wherein the control means for the outlet members comprise cylinders passing radially through the explosion chambers, and valve stems movable in said cylinders and carrying the outlet members.

8. Heat power plant as defined in claim 6, wherein the explosion chambers are secured directly to the rotor housing, and including valve seats for the outlet members in the portion of each chamber wall closest to the rotor housing, said seat being approximately within the outline of said rotor housing.

9. Heat power plant as defined in claim 8, including nozzle conduits extending radially from the valve seats to the nozzles.

10. Heat power plant as defined in claim 1, wherein the rotors are two in number, and wherein each chamber is provided with three controlled outlet members, nozzles being associated with only two of the outlet members, the third outlet member discharging into the space behind the second rotor.

References Cited in the file of this patent

UNITED STATES PATENTS

| | | |
|---|---|---|
| 1,931,545 | Holzwarth | Oct. 24, 1933 |
| 1,982,664 | Holzwarth | Dec. 4, 1934 |
| 1,987,631 | Noack | Jan. 15, 1935 |
| 2,245,954 | Anxionnaz | June 17, 1941 |
| 2,587,057 | McVeigh | Feb. 26, 1952 |
| 2,603,063 | Ray | July 15, 1952 |

FOREIGN PATENTS

| | | |
|---|---|---|
| 508,311 | France | July 21, 1920 |